United States Patent [19]

Suzuki et al.

[11] Patent Number: 5,375,639
[45] Date of Patent: Dec. 27, 1994

[54] PNEUMATIC TIRE

[75] Inventors: Toshihiko Suzuki; Eiichi Iida; Hiroya Takenaka, all of Hiratsuka, Japan

[73] Assignee: The Yokohhama Rubber Co., Ltd., Tokyo, Japan

[21] Appl. No.: 85,097

[22] Filed: Jul. 2, 1993

Related U.S. Application Data

[63] Continuation-in-part of Ser. No. 899,969, Jun. 17, 1992, abandoned.

[30] Foreign Application Priority Data

Jul. 10, 1991 [JP] Japan .................. 3-169970

[51] Int. Cl.$^5$ ............................. B60C 11/06
[52] U.S. Cl. ............................. 152/209 R
[58] Field of Search ................ 152/209 R, 209 D; D12/146, 147

[56] References Cited

U.S. PATENT DOCUMENTS

| | | | |
|---|---|---|---|
| 3,682,220 | 8/1972 | Verdier | 152/209 R |
| 4,308,083 | 12/1981 | Toth, Jr. | 152/209 R |
| 4,456,046 | 6/1984 | Miller | 152/209 R |
| 4,773,459 | 9/1988 | Yamaoka et al. | 152/209 R |
| 4,932,452 | 6/1990 | Kawabata et al. | 152/209 R |
| 4,962,801 | 10/1990 | Tsuda | 152/209 R |

FOREIGN PATENT DOCUMENTS

| | | |
|---|---|---|
| 1163341 | 9/1958 | France . |
| 3727050 | 2/1989 | Germany . |
| 0079005 | 6/1981 | Japan . |
| 0297108 | 12/1988 | Japan . |
| 3074208 | 3/1991 | Japan . |

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic tire for passenger cars, formed on its tread surface with at least one main groove extending in the circumferential direction of the tire, a number of sub-grooves extending in the widthwise direction of the tire, and a plurality of sub-main grooves extending at an angle of inclination within a range of 3° to 30° to the circumferential direction of the tire and to a length greater than a defined contact length of the tire, the or each main groove having a groove depth of 65% or more of the thickness of a tread rubber and a groove width which is greater than its groove depth and is within a range of 6 to 9% of a tread expansion width, each sub-main groove including such a wider or broader portion which has a groove depth of 65% or more of the thickness of the tread rubber and a groove width which is greater than its groove depth and is within a range of 3.5 to 6% of the tread expansion width, at least one protuberance being provided on each of the bottom of the main groove and the bottom of the wider or broader portion of the sub-main groove, extending along the main groove and the sub-main grooves.

7 Claims, 2 Drawing Sheets

PNEUMATIC TIRE

This is a continuation-in-part application of U.S. Ser. No. 07/899,969, filed Jun. 17, 1992 now abandoned.

BACKGROUND OF THE INVENTION

The present invention relates to a pneumatic tire for passenger cars. More particularly, the invention relates to a pneumatic tire for passenger cars which has a main groove and sub-main grooves having an increased groove width so that the tire can exhibit an improved drainability and yet the uniformity of which is not deteriorated.

When a green tire is vulcanized and molded in a molding die, unvulcanized rubber in the tire's tread portion is pushed aside by groove forming ribs of the die, undergoes fluidization and forms a tread pattern. The tire molding die is formed with a main groove forming rib corresponding to a main groove extending in a tire circumferential direction and sub-groove forming ribs corresponding to sub-grooves extending in a tire widthwise direction. When a green tire is molded in the die, the quantity of rubber removed by the main groove forming rib is greater than that of rubber removed by the sub-groove forming ribs. Therefore, disturbance such as corrugation is likely to occur in a belt layer portion located near groove bottoms, depending on the formation condition of the main groove.

In order to provide a pneumatic tire for passenger cars improved in or relating to the drainability, the inventors of the present invention previously proposed such a tire in which the groove width of the main groove that is provided extending in the tire circumferential direction, in a number of at least one, is set to be greater than its groove depth and, in addition, a plurality of sub-main grooves having a groove width larger than their groove depth alike the main groove or grooves is provided, slantly extending at an angle of 3° to 30° to the tire circumferential direction and to a length greater than a defined contact length of the tire as later to be detailed.

However, in the cases of pneumatic tires for passenger cars, the thickness in their tread portion is relatively limited when compared with heavy-duty pneumatic tires, so that if the groove width of the main groove or sub-main grooves is set to be greater than the groove depth in the cases of passenger-car pneumatic tires as above, such a portion of unvulcanized rubber which should be removed by a main groove forming rib during vulcanization and molding cannot fully flow in a central region in the widthwise direction of the main groove forming rib towards outside of the main groove forming rib but tends to press against an underlying belt layer, whereby there tends to occur an undesirable phenomenon such that the belt layer undergoes corrugation or wave-forming deformation. A tire in which the belt layer undergone such corrugation phenomenon does not have a desirable uniformity and involves the problem of an increase in the radial force variation (RFV) and the radial run-out (RRO).

SUMMARY OF THE INVENTION

In the field of pneumatic tires for passenger cars of the type in which a main groove and sub-main grooves are so formed as to have a groove width larger than their groove depth so that the tire can exhibit an improved drainability, a primary object of the present invention is to provide such a pneumatic tire for passenger cars of which a belt layer is prevented from undergoing the corrugation phenomenon and a lowering of the tire uniformity is thereby prevented from occurring.

The pneumatic tire for passenger cars for attaining the above object according to the present invention is formed on its tread surface with at least one main groove extending in the circumferential direction of the tire, a number of sub-grooves extending in the widthwise direction of the tire, and a plurality of sub-main grooves slantly extending at an angle of 3° to 30° relative to the tire circumferential direction and to a length greater than a defined contact length of the tire as later to be detailed. The main groove has a groove depth of 65% or more of the thickness of a tread rubber of the tire and a groove width which is larger than its groove depth and is within a range of 5 to 9% of a tread expansion width. Each sub-main groove includes such a wider or broader portion which has a groove depth of 65% or more of the thickness of the tread rubber and a groove width which is larger than its groove depth and is within a range of 3.5 to 6% of the tread expansion width. On the bottom of the main groove and the wider portion of the sub-main grooves, there is formed at least one protuberance extending along the main groove and the sub-main grooves.

Since the protuberance is disposed on the groove bottom of each of the main and the portions of sub-main grooves where the groove width is increased, unvulcanized rubber which cannot undergo sufficient fluidization to the outer zones of the groove forming rib in the central portion of the groove forming rib in the widthwise direction during vulcanization and molding flows into the cavity so formed in the groove forming rib as to correspond to the protuberance, and lessens the push force to the belt layer. Accordingly, corrugated deformation does not occur in the belt layer and the drop of uniformity of the tire is not observed.

In the present invention, the term "defined contact length of the tire" represents the length of the contact surface shape in the tire circumferential direction, which is formed when an internal pressure stipulated by JATMA is charged into the tire and a design load stipulated likewise by JATMA is applied.

DESCRIPTION OF THE PREFERRED EMBODIMENTS

Figure 1:
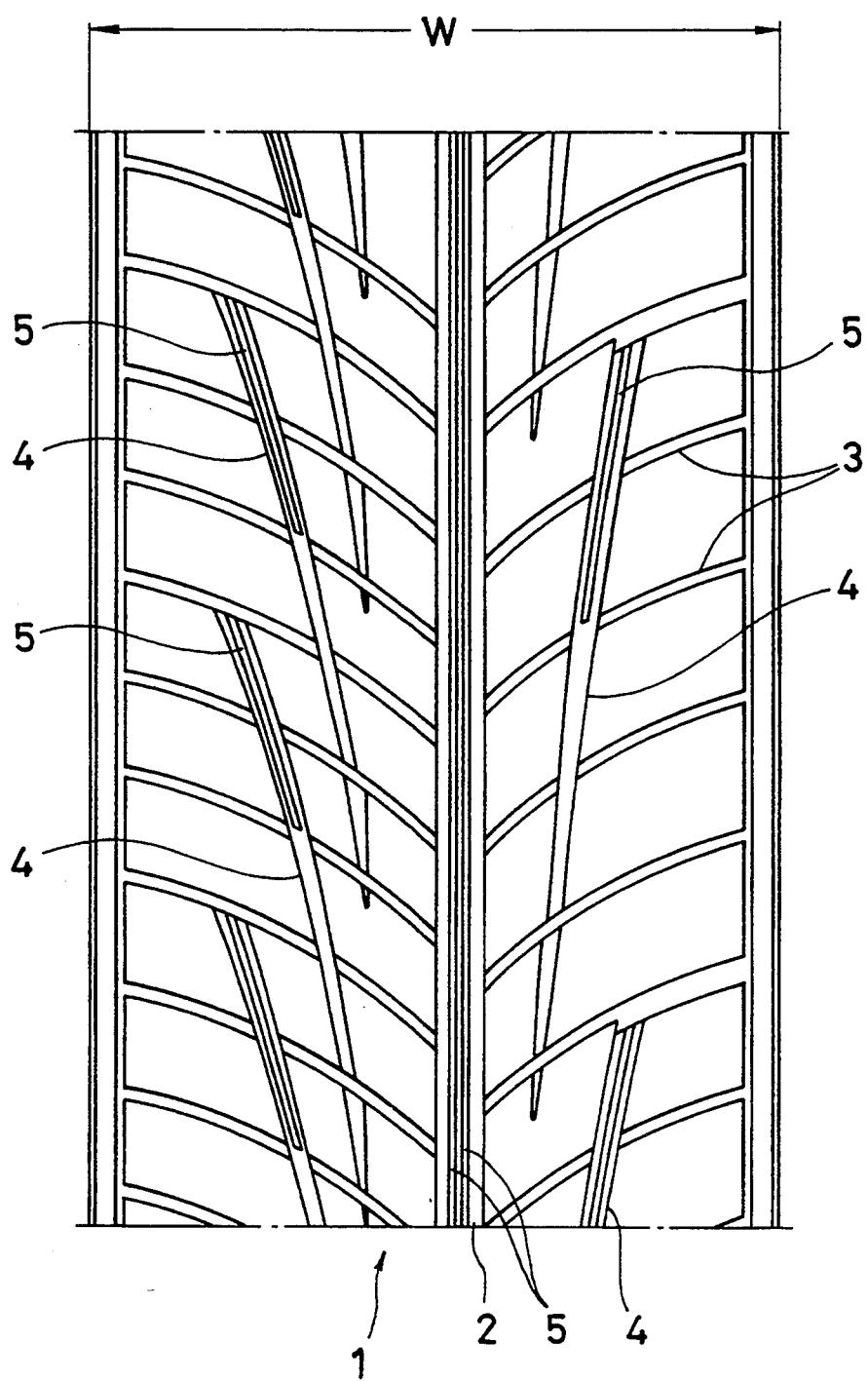
FIG. 1 is an exploded plan view, showing an example of tread patterns of a pneumatic tire for passenger cars according to the present invention.
Figure 2:
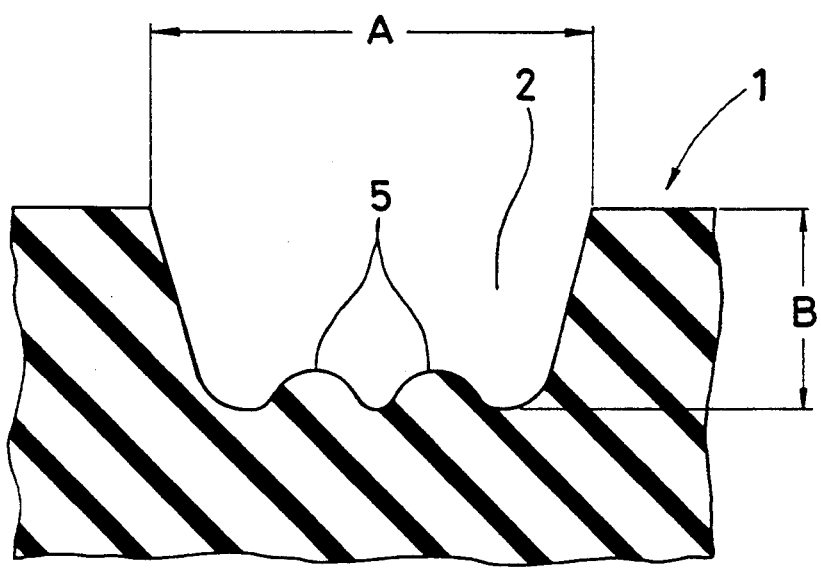
FIG. 2 is a sectional view of the main groove shown in FIG. 1, taken on a section in %he meridian direction of the tire.

In FIG. 1, the reference numeral 1 denotes a tread surface having a tread expansion width W. A straight main groove 2 having an extremely large width is disposed at the center of the tread surface in the direction of its width and extends in a tire circumferential direction. A large number of sub-grooves 3 are formed on both right and left sides of the main groove 2 in such a manner as to extend up to shoulder end portions in the tire widthwise direction. A large number of sub-main grooves 4, which are slightly inclined in the .tire circumferential direction, are disposed so as to supplement the single main groove 2. These sub-main grooves 4 mutually cross a large number of sub-grooves 3 described above, extend diagonally within the range of 3° to 30° of the tire circumferential direction and over a distance longer than the tire contact length.

The groove width A of the straight main groove 2 has a groove depth B of 65% or more of the thickness of a tread rubber and a groove width A which is greater than the groove depth B and which in addition is within the range of 6 to 9% of the tread expansion width W. On account of that the groove depth B of main groove 2 is so deep as to be 65% or more of the tread rubber thickness and, in addition, the groove width A is so broad as to be 6% or more of the tread expansion width W as above, the pneumatic tire can exhibit a high drainability. If the groove width A is greater than 9% of the tread expansion width W, the rigidity in the widthwise direction drops and the wear resistance drops, as well. Therefore, the groove width A must be not more than 9%. Each sub-main groove 4 includes a wider or broader portion having a groove depth of 65% or more of the tread rubber thickness, a groove width which is greater than the groove depth and is within a range of 3.5 to 6% of the tread expansion width, and the remaining portion of the sub-main groove 4 has a groove width smaller than the above boader portion. They including a broader portion as above, the sub-main grooves 4, can bring about a high draining effect in addition to the draining effect brought about by the main groove 2.

Two protuberances 5 are disposed in parallel with each other at the center region of the groove bottom of the main groove 2 along the main groove. A protuberance 5 is also disposed at the groove bottom in the broader portion having a relatively large groove width of each sub-main groove 4. Preferably, the sectional shape of the upper surface of the protuberance 5 is shaped in an arc having a radius of curvature of at least 0.5 mm in order to make fluidization of unvulcanized rubber smooth, and the protuberance preferably has a height of 0.5 to 1.6 mm from the groove bottom 2a. If the height of the protuberance 5 from the groove bottom 2a is less than 0.5 mm, the size of the protuberance 5 is insufficient and there is no technical meaning for disposing such a low protuberance 5. If it exceeds 1.6 mm, on the contrary, it exceeds the height of a wear indicator inside the groove, so that the function of the wear indicator is lost. When two or more protuberances 5 are disposed on the groove bottom, their gap is set preferably to be greater than 1 mm.

The protuberance portions disposed on the groove bottom of the main groove 2 and the sub-main groove 4 having a large groove width are formed at the center of the end surface of a groove shaping Fib as a concavity in a molding die. Therefore, when a green tire is vulcanized and molded, a portion of unvulcanized rubber which cannot sufficiently flow outside a zone at the center region of the wide groove forming rib can be absorbed by the concavity, so that a push force to a lower located belt layer can be lessened. As a result, the belt layer does not undergo corrugated deformation and the tire uniformity can be improved.

In or for the present invention, the protuberance 5 that is to be provided in a number of at least one as described above is located in such portion of the main groove 2 in which the groove depth is 65% or more of the tread rubber thickness and the groove width is greater than the groove depth and is within a range of 6 to 9% of the tread expansion width and in such portion of sub-main grooves 4 in which the groove depth is 65% or more of the tread rubber thickness and the groove width is greater than the groove depth and is within a range of 3.5 to 6% of the tread expansion width. If the protuberance 5 is provided in such portion of the main groove 2 and the sub-main grooves 4 in which the groove depth is less than 65% of the tread rubber thickness, the possibility of unvulcanized rubber to flow is relatively limited, so that not only it is meaningless to provide a protuberance in such a portion but is it also likely that the groove volume is then reduced to result in a lowering of the draining characteristic. Also, if the protuberance 5 is provided in such portion of the main groove 2 in which the groove width is less than 6% of the tread expansion width or in such portion of the sub-grooves 4 in which the groove width is less than 3.5% of the tread expansion width, the amount of rubber tends to be insufficient in the region of the protuberance at the time of vulcanization and molding, whereby the belt layer is likely to be permitted to undergo corrugating deformation, and in addition, the draining characteristic is prone to be lowered on account of a reduction of the groove volume.

EXAMPLE

There were produced a tire 1 according to the present invention, having a tire size of 245/40 ZR17, a tread pattern as shown in FIG. 1 of the accompanying drawings and various dimensional details as recited below, and a comparative tire 1 structurally identical with the above tire 1 of the present invention except that this tire was not provided with protuberances provided to the tire 1 of the invention.

tread expansion width: 222 mm;

groove width, main groove: 18 mm (8.1% of the tread expansion width);

groove depth, main-groove: 8.2 mm (79% of the tread rubber thickness);

protuberance in main groove: provided over whole circumference of the tire; height: 1.5 mm;

maximum groove width, sub-main grooves: 13 mm (5.9% of the tread expansion width);

groove depth, sub-main grooves: 7.2 mm (69% of the tread rubber thickness);

protuberance in sub-main grooves: provided in such portion of the sub-main grooves in which the groove width is within a range of 3.5 to 5.9% of the tread expansion width; height: 1.5 mm;

angle of inclination of sub-main grooves to the tire circumferential direction: 10°.

With each of the above tire 1 of the present invention and comparative tire 1 inflated to an air pressure of 2 kgf/cm$^2$, their RFV and RRO were determined according to the following measuring conditions, to obtain results as shown in Table 1 below. RFV:

Found according to the method prescribed in Automobile Standard C607-87 of JASO (Japanese Automobile Standard Organization): A load specified for each tire size was applied to the tire 1 of the invention and the comparative tire 2 each fitted to a rim, and with each tire then pressed against a rotary drum, the tire axis was rotated while the distance between the tire axis and the drum axis was fixed. Reaction forces acting on the drum axis were measured and the variation of the reaction forces on the circumference of the drum axis was determined. RRO:

In accordance with the above measuring method for RFV, absolute values of deflection in the radial direction of tires (the degrees of roundness) were determined.

In the following Table 1, reciprocals of measured RFV and RRO values are shown in terms of indices, taking the values of the comparative tire 1 as 100. A larger index value represents an exceeding tire uniformity.

TABLE 1

|  | comparative tire 1 | tire 1 of invention |
|---|---|---|
| RFV | 100 | 115 |
| RRO | 100 | 105 |

From the above Table 1, it is clearly seen that the tire 1 according to the present invention exceeds the comparative tire 1 with respect to each of the RFV and RRO values and is improved in or relating to the tire uniformity over the comparative tire 1.

Also, the respective tires were sectioned at their respective crown portions, and the distribution of rubber thickness in the crown portion of each tire was determined to find that the variation of the rubber thickness was less with the tire 1 of the present invention than with the comparative tire 1.

There were also produced four further different tires, a tire 2 according to the present invention and comparative tires 2, 3 and 4: The tire 2 of the invention was structurally identical with the above described tire 1 of the invention except that the width of the main groove was modified to be 7.5% of the tread expansion width, that the maximum groove width of sub-main grooves was modified to be 4.5% of the tread expansion width and the location of the protuberance provided in sub-main grooves was so modified as to be where the width of the sub-main grooves was within a range of 3.5 to 4.5% of the tread expansion width; the comparative tire 2 was structurally identical with the above described tire 2 of the invention except that this tire was not provided with the protuberance; the comparative tire 3 was structurally identical with the earlier described tire 1 of the invention except that the groove width of the main groove was modified to be 4.5% of the tread expansion width, that the maximum width of sub-main grooves was modified to be 3% of the tread expansion width and that the protuberance was provided over a whole area of sub-main grooves; and the comparative tire 4 was structurally identical with the above comparative tire 3 except that this tire was not provided with the protuberance.

Of each of the above tire 2 of the invention and comparative tires 2 through 4, the RFV and RRO values were determined under same measuring conditions as above described, and determinations of the tire's drainability (draining characteristic) were carried out under the following measurement conditions, followed by comparative evaluations of the tires to obtain results as shown in Table 2 below. Drainability:

Four each of the respective tires were mounted on a passenger car, and the car was run on a circular test course of a radius of 30 m partly formed with a puddle area having a water depth of 10 mm, and the lateral acceleration generated when the car passed the puddle area were determined at gradually increased running speeds. The lateral acceleration values determined for each 5 km/h increase within a range of the car running speed of from 45 km/h to a speed at which the lateral acceleration became zero (0) on account of slipping of tires were summed up. Results of comparative evaluations are shown in the below Table 2 in terms of indices with the sum of lateral acceleration values found of the comparative tire 2 taken as 100. A larger index value represents an exceeding drainability.

TABLE 2

|  | Tire 2 of Present Invention | Comparative Tires 2 | 3 | 4 |
|---|---|---|---|---|
| Drainability | 98 | 100 | 90 | 92 |
| RFV | 115 | 100 | 98 | 115 |
| RRO | 105 | 100 | 98 | 105 |

As clearly seen from the above Table 2, the tire 2 according to the present invention has an improved uniformity while it retains a drainability comparable to that of the comparative tire 2. With the comparative tire 4, the groove width of the main groove and the sub-main grooves is relatively limited, and on account of this, while the tire has a desirable tire uniformity, its draining characteristic is very poor. With the comparative tire 3, protuberances were provided over a whole of relatively narrow main groove and sub-main grooves, and because of this, not only the drainability but also the uniformity are poor.

As described above, where the groove width of each of the main groove and the sub-main groove is set to be greater than the groove depth in order to improve drainability, at least one protuberance extending in the direction of the groove is provided on the groove bottom according to the present invention, so that at the time of vulcanization and molding, it can take place that unvulcanized rubber is permitted to be absorbed in the concavity in the groove forming rib corresponding in location to the protuberance. Therefore, the pressing force that incompletely flowable unvulcanized rubber may possibly apply to a lower located belt layer can be lessened to prevent the belt layer from undergoing a corrugated deformation, whereby lowering of the tire uniformity can be avoided.

What is claimed is:

1. A pneumatic tire for passenger cars, formed on its tread surface with a single main groove extending in the circumferential direction of the tire, a number of sub-grooves extending in the widthwise direction of the tire, and a plurality of substantially straight sub-main grooves extending at an angle of inclination within a range of 3° to 30° to the circumferential direction of the tire and extending to a length greater than a defined contact length of the tire, said defined contact length of the tire being the length of contact surface shape in the circumferential direction of the tire formed with the tire at a standard internal pressure and a standard design load, the single main groove having a groove depth of 65% or more of the thickness of a tread rubber and a groove width which is greater than its groove depth and is within a range of 6 to 9% of a tread expansion width, each sub-main groove including such a wider portion which has a groove depth of 65% or more of the thickness of the tread rubber and a groove width which is greater than its groove depth and is within a range of 3.5 to 6% of the tread expansion width, at least one protuberance being provided on the bottom of the single main groove and the bottom of the wider portion of each of the sub-main grooves, extending along the single main groove and the sub-main grooves.

2. A pneumatic tire according to claim 1, wherein the protuberance has an arc-shaped upper surface in cross-section.

3. A pneumatic tire according to claim 2, wherein the arc-shaped upper surface has a radius of curvature of at least 0.5 mm.

4. A pneumatic tire according to claim 1, wherein the protuberance has a height from the groove bottom within a range of 0.5 to 1.6 mm.

5. A pneumatic tire according to claim 2, wherein the protuberance has a height from the groove bottom within a range of 0.5 to 1.6 mm.

6. A pneumatic tire according to claim 1, wherein the protuberance is provided in a number of at least two on a groove bottom with a gap of at least 1 mm between each adjacent protuberances.

7. A pneumatic tire according to claim 2, wherein the protuberance is provided in a number of at least two on a groove bottom with a gap of at least 1 mm between each adjacent protuberances.

* * * * *

UNITED STATES PATENT AND TRADEMARK OFFICE
CERTIFICATE OF CORRECTION

PATENT NO. : 5,375,639

DATED : December 27, 1994

INVENTOR(S) : Toshihiko SUZUKI et al

It is certified that error appears in the above-indentified patent and that said Letters Patent is hereby corrected as shown below:

On the title page, item [73], change "Yokohhama" to --Yokohama--.

Signed and Sealed this

Fifteenth Day of August, 1995

Attest:

BRUCE LEHMAN

Attesting Officer          Commissioner of Patents and Trademarks